US010138882B1

United States Patent
Self et al.

(10) Patent No.: US 10,138,882 B1
(45) Date of Patent: Nov. 27, 2018

(54) CONTROLLING A PUMP

(71) Applicant: Villicus, Inc.

(72) Inventors: Russell Self, Edmond, OK (US); Bill Mann, Midland, TX (US)

(73) Assignee: Villicus, Inc., Norman, OK (US)

( * ) Notice: Subject to any disclaimer, the term of this patent is extended or adjusted under 35 U.S.C. 154(b) by 512 days.

(21) Appl. No.: 14/301,110

(22) Filed: Jun. 10, 2014

Related U.S. Application Data

(60) Provisional application No. 61/833,434, filed on Jun. 10, 2013.

(51) Int. Cl.
| | |
|---|---|
| F04B 49/06 | (2006.01) |
| F04D 1/06 | (2006.01) |
| F04D 15/00 | (2006.01) |
| G05D 7/06 | (2006.01) |

(52) U.S. Cl.
CPC .............. F04B 49/065 (2013.01); F04D 1/06 (2013.01); F04D 15/0066 (2013.01); G05D 7/0617 (2013.01)

(58) Field of Classification Search
CPC ...... F04B 49/065; F04D 1/06; F04D 15/0066; G05D 7/0617
See application file for complete search history.

(56) References Cited

U.S. PATENT DOCUMENTS

| | | | | |
|---|---|---|---|---|
| 4,830,218 A | * | 5/1989 | Shirkhan | B67D 7/08 222/52 |
| 4,867,633 A | * | 9/1989 | Gravelle | F04D 29/167 415/106 |
| 5,996,422 A | * | 12/1999 | Buck | F04B 49/065 702/25 |
| 2003/0219347 A1 | * | 11/2003 | Mascola | F01C 21/02 417/365 |
| 2005/0201882 A1 | * | 9/2005 | Maccarrone | F04B 37/14 417/572 |
| 2006/0142692 A1 | * | 6/2006 | Jacobson | A61M 5/16886 604/67 |
| 2007/0114162 A1 | * | 5/2007 | Stiles | F04D 15/0066 210/137 |
| 2007/0175513 A1 | * | 8/2007 | McLoughlin | G05D 16/208 137/87.02 |
| 2010/0150737 A1 | * | 6/2010 | Anderson | E21B 47/042 417/44.1 |
| 2012/0102639 A1 | * | 5/2012 | Bovill | E03C 1/12 4/679 |
| 2014/0374089 A1 | * | 12/2014 | Coles | E21B 23/08 166/250.01 |

* cited by examiner

*Primary Examiner* — Kenneth M Lo
*Assistant Examiner* — David J Wynne
(74) *Attorney, Agent, or Firm* — Hall Estill Attorneys at Law

(57) ABSTRACT

An apparatus and associated method for operating a pump. A flow controller executes computer instructions stored in memory that define a selected flow rate of the fluid flowing out of the pump based on a flow profile trajectory stored in memory and related to a parameter of the fluid. A motor controller executes computer instructions stored in memory that map the selected flow rate to a selected motor speed via a transformation function stored in memory, and that operate the motor at the selected motor speed.

6 Claims, 7 Drawing Sheets

CONTROLLING A PUMP

RELATED APPLICATION

The current application claims priority to the U.S. Provisional Application Ser. No. 61/833,434 filed Jun. 10, 2013.

SUMMARY

Some embodiments of the described technology contemplate an apparatus having a motor operating a pump to pressurize a fluid inside the pump. A flow controller executes computer instructions stored in memory that define a selected flow rate of the fluid flowing out of the pump based on a flow profile trajectory stored in memory and related to a parameter of the fluid. A motor controller executes computer instructions stored in memory that map the selected flow rate to a selected motor speed via a transformation function stored in memory, and that operate the motor at the selected motor speed.

Some embodiments of the described technology contemplate a pumping system having a multiple stage pump. A motor operably rotates the stages to pressurize a fluid inside the pump. A motor speed control device controls the speed of the motor. A flow control device is in fluid communication with the pump. A controller executes flow control logic stored in memory that adjusts the flow control device to a position corresponding to a selected flow rate of the pressurized fluid from the pump, and that adjusts the motor speed control device independently of adjusting the flow control device.

Some embodiments of the described technology contemplate a method including:
obtaining a pumping system having a multiple stage centrifugal pump, a motor operably rotating the stages to pressurize a fluid inside the pump, a motor speed control device, and a flow control device in fluid communication with the pump; and adjusting the flow control device to a position corresponding to a selected flow rate of the pressurized fluid from the pump, and adjusting the motor speed control device independently of the adjusting the flow control device to balance up thrust and down thrust forces of the fluid on the stages at the selected flow rate.

DETAILED DESCRIPTION

Initially, it is to be appreciated that this disclosure is by way of example only, not by limitation. The pump control concepts herein are not limited to use or application with any specific system or method that includes moving a fluid via a pump. Thus, although the instrumentalities described herein are for the convenience of explanation, shown and described with respect to exemplary embodiments, it will be appreciated that the principles herein may be applied equally in other types of systems and methods employing a pump.

Figure 1:
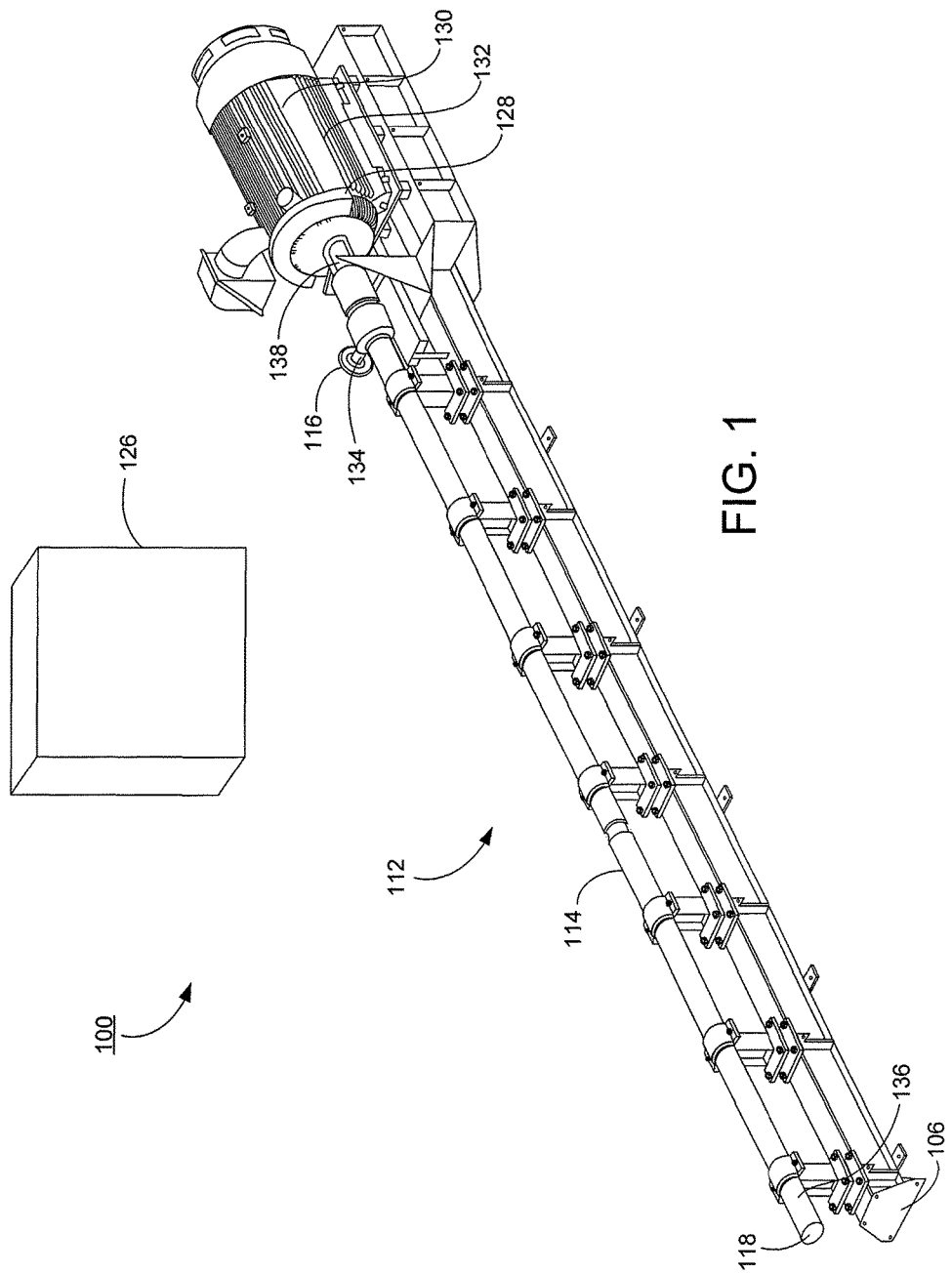
FIG. 1 is an isometric depiction of a portion of a horizontal pump system (HPS) that is constructed in accordance with embodiments of this technology.

Turning first to FIG. 1 which is an isometric depiction of a pumping system 100 that is constructed in accordance with illustrative embodiments of the present invention. The pumping system 100 includes a multistage centrifugal pump mounted horizontally at the surface, commonly referred to as a horizontal pumping system ("HPS"), although the contemplated embodiments are not so limited. In the field of oil and gas production technology, for example, fluids are routinely pressurized for various purposes such as production and handling. For example, an HPS is frequently used to transfer fluids within surface pipeline systems, and perhaps ultimately to inject the fluids into a wellbore. The multistage centrifugal pump can also be used in a vertical configuration within a wellbore, commonly referred to as an electric submersible pumping system ("ESPS"), primarily as a production pump for pumping fluids from the well to the surface pipeline systems. Although not depicted, the skilled artisan readily ascertains that the presently disclosed technology can also be used in an ESPS in equivalent alternative embodiments of the claimed invention.

Figure 2:
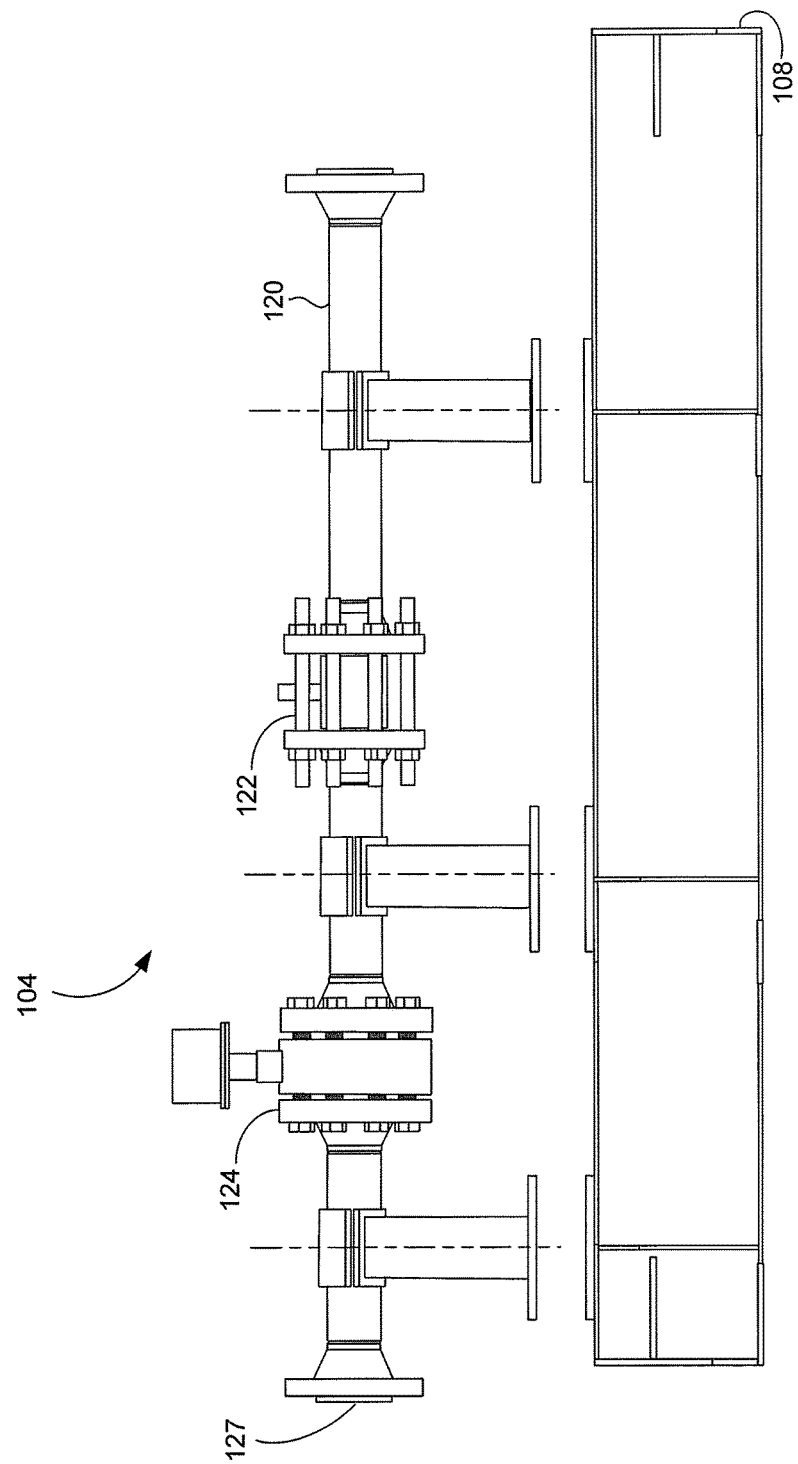
FIG. 2 is a flow control skid portion of the HPS of FIG. 1.

The pumping system 100 in the illustrative embodiments of FIG. 1 is generally part of a modular construction that joins a pump skid 102 with a flow control skid 104 (FIG. 2). Both skids have components supported upon a structural foundation, the skid, for transit and installation. The two skids 102, 104 are structurally connected together by attaching a distal bulkhead plate 106 of the pump skid 102 to a proximal bulkhead plate 108 of the flow control skid 104, such as bolting and/or welding the bulkhead plates 106, 108 together. This modular construction advantageously permits mixing and matching the skids so that a particular motor/pump configuration can be combined with one of a plurality of different flow control skids depending on what the particular flow control constraints are.

The pump skid 102 includes a motor 110 operating a pump 112 to pressurize a fluid inside the pump 112. In illustrative reduction to practice the motor 110 can be a 900 horsepower electric motor equipped with a variable speed control making it operable from about 30 hertz to about 90 hertz, corresponding to a speed range of about 1800 revolutions per minute to about 3500 revolutions per minute.

The pump 112 has an elongated cylindrical housing 114 enclosing a plurality of axially aligned pump stages. The housing 114 defines a suction-side inlet 116 to admit the fluid into the pump 112, and a discharge-side outlet 118 to pass the pressurized fluid out of the pump 112. Each stage includes an impeller that is rotated by the motor 110 with respect to a corresponding stationary diffuser. In order to obtain a desired pressure of the fluid at the outlet 118, an adequate number of the stages are stacked end-to-end within the housing 114 so that they cumulatively provide the desired outlet pressure.

The flow control skid 104 in FIG. 2 has a pipe 120 connected to the pump outlet 118 (FIG. 1) to direct the pressurized fluid through a flow meter 122. A flow control valve 124 is selectively position able to choke the flow to a desired flow rate and corresponding head pressure against which the pump 112 operates. The fluid exits the flow control skid 104 through an outlet 127.

In accordance with the present technology, a processor-based controller 126 (FIG. 1) commands a selected flow rate of the fluid from the pump 112. The selected flow rate generally depends on what application the HPS 100 is performing. Whatever drives the determination of the selected flow rate, the controller 126 also operates the motor 110 at a selected speed so that at the selected flow rate the pump 112 operates at optimal efficiency. In these depicted illustrative embodiments the controller 126 wirelessly receives parametric data transmissions from the HPS 100 and transmits command signals to the HPS 100 via a computer network. These network communication links can be established such as via radio frequency (RF) communications, although the contemplated embodiments are not so limited.

In these illustrative embodiments the wireless network communications include data from transmitting temperature sensors. Transmitting temperature sensors 128, 130 inform the controller 126 of the temperatures of the motor outboard bearing and the motor inboard motor bearing, respectively. Another transmitting temperature sensor 132 similarly informs the controller 126 of the motor winding temperature.

The wireless network communications also include data from transmitting pressure sensors. A transmitting pressure sensor 134 informs the controller 126 of the pressure of the liquid entering the suction inlet of the pump. Another transmitting pressure sensor 136 informs the controller 126 of the pressure of the fluid leaving the discharge outlet 118. Yet another transmitting pressure sensor (not depicted) informs the controller 126 of the line pressure in whatever is connected to the pump assembly 100, be it a pipeline, a distribution header, a reservoir, and the like, downstream of the flow control valve 124. The wireless network communications can also include other data inputs, such as but not limited to a transmitting vibration sensor 138 indicating the magnitude of motor shaft and/or pump shaft vibration.

Figure 3:
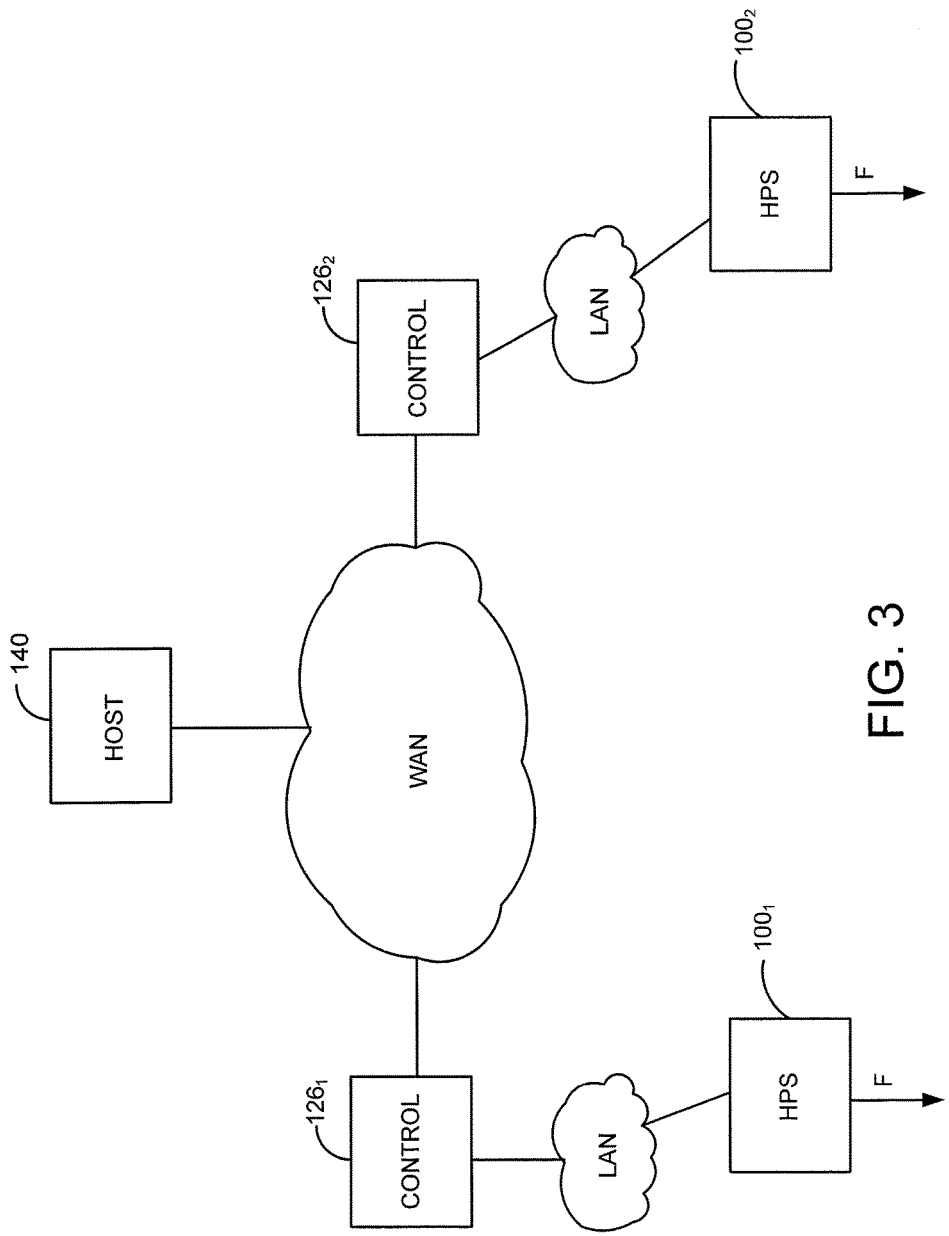
FIG. 3 is a block diagram of a distributed control system of two HPSs communicating via a network connection.

FIG. 3 is a functional block depiction of a host device 140 communicating via a wide area network, such as the Internet, with two controllers $126_1$, $126_2$. Each controller 126 includes a processor-controlled communications module establishing a network connection for supervisory control and data acquisition system with the number of transmitting elements of the HPS 100. For example, without limitation, the communications module interfaces with the transmitting elements via an Ethernet bridge operating at a non-standard frequency and with encoded data transmissions.

Returning to FIG. 1, some exemplary transmitting elements of the HPS 100 include motor bearing temperature sensors 128, 130, motor winding temperature sensor 132, the motor/shaft vibration sensor 138, suction pressure sensor 134, and discharge pressure sensor 136. Turning to FIG. 2, some exemplary transmitting elements of the FCS 104 include output from the flow rate meter 122 indicating flow rate, and output from the control valve 124 indicating the valve position (such as percent open).

Figure 4:
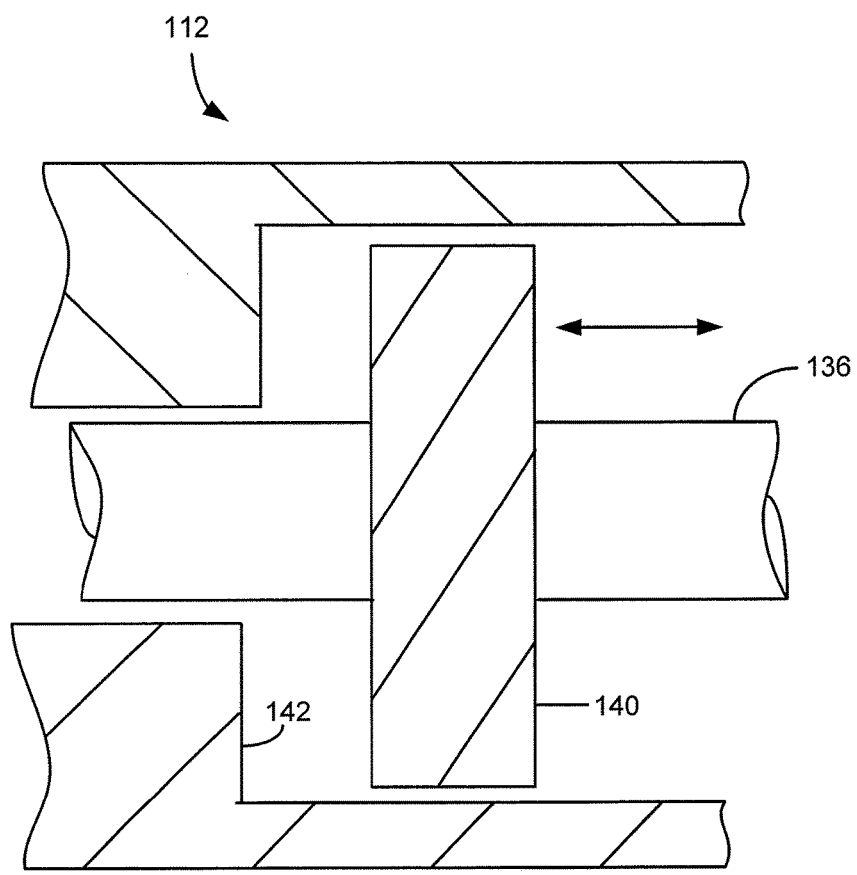
FIG. 4 is a diagrammatic depiction of a rotating impeller and a stationary diffusor in the pump of the HPS of FIG. 1.

FIG. 4 diagrammatically depicts one of the multiple pumping stages in the pump 112. Each stage has an impellor 140 that is rotated by a shaft 136 connected to the output shaft of the motor 110. Each stage also has a stationary diffuser 142 through which the impellor 134 pumps fluid. The impellor 140 has a freedom of longitudinal displacement in the directions of the double-headed arrow. The distance between the impellor 140 and the diffuser 142 varies in relation to the pressure created by the impellor 140 (head). The pump manufacturer provides pump efficiency curves, that specify maximum and minimum operating head for a given flow rate. Operating the pump 112 outside these limits results in adverse wear and tear on the pump 112 and reduced operating life.

Figure 5:
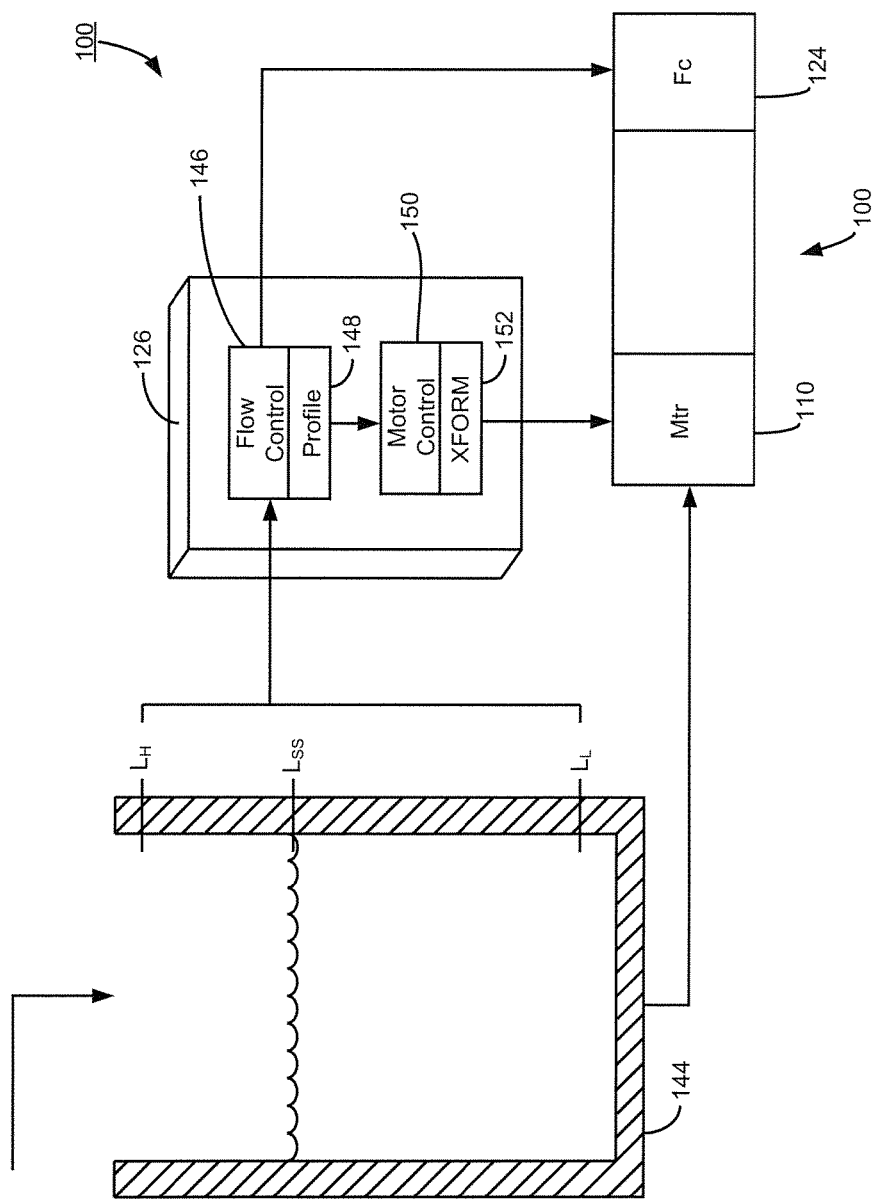
FIG. 5 is a diagrammatic depiction of the HPS of FIG. 1 controlling the level of fluid in a holding tank.

Generally, the present technology provides dynamic control of the HPS 100 so that it can maintain an optimal pumping performance at each of a number of different flow rates. The reason for pumping at different flow rates is dependent on the pump application. For purposes of illustration, FIG. 5 diagrammatically depicts a fluid storage tank 144 that basically serves the function of a fluid buffer in the surface pipeline distribution system. Fluid flows into the fluid storage tank 144, such as from another distant surface pump or a downhole pump, and the HPS 100 pumps the fluid from the fluid storage tank 144 such as to another buffer or into a well. The HPS 100 of this technology can be employed to advantageously maintain a desired steady-state fluid level in the tank 144 by pumping fluid out at various flow rates depending on the fluid flow into the tank 144.

Instantaneous flow rates are determined in relation to a monitored parameter of the fluid in the tank 144. For example, in these illustrative embodiments the tank 144 is equipped with fluid level monitoring equipment, such as fluid detecting elements, to directly measure when the fluid level is at or above certain preselected levels. In these illustrative embodiments three such detectors are installed in the tank 144 to detect when the fluid has reached a maximum desired level, the high level $L_H$, when the fluid has reached a minimum desired level, the low level $L_L$, and when the fluid has reached an intermediate target steady state level $L_{SS}$. In alternative equivalent embodiments the fluid level can be calculated as a static head producing a monitored pressure at a selected position of the tank 144.

Figure 6:
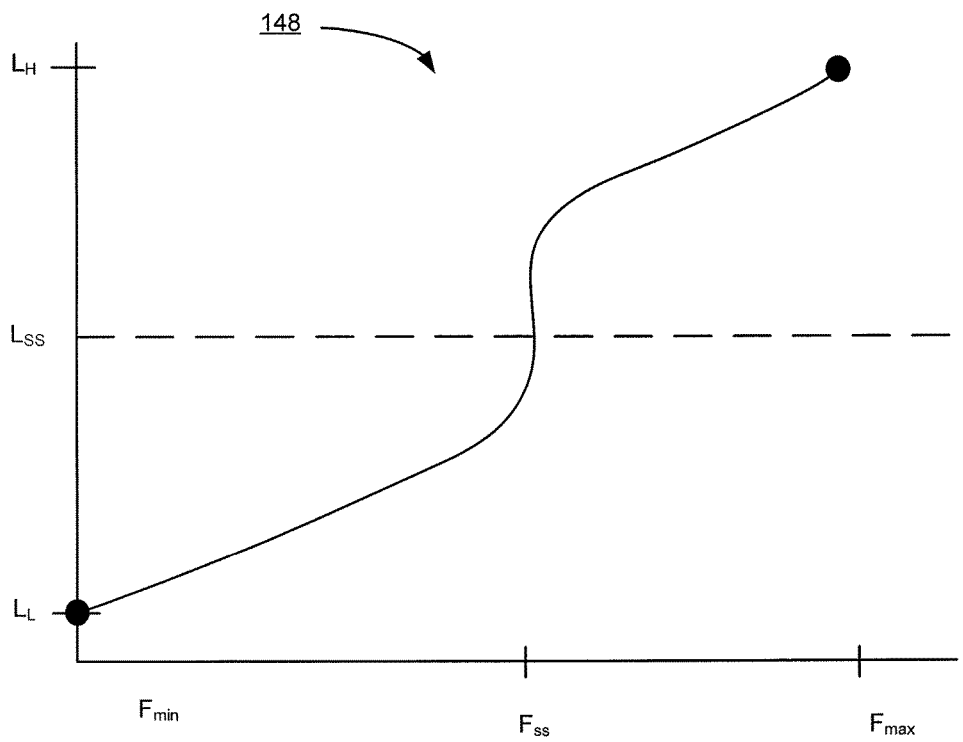
FIG. 6 is a graphical representation of a flow profile stored in memory and indexed to define the flow rate in relation to the level of fluid in the tank.

The controller 126 includes a flow control module 146 that has stored in memory a flow profile 148 used to compensate for fluid level error in the tank 144. The term "fluid level error" for purposes of this description means any deviation from the target $L_{SS}$, either above or below. FIG. 6 diagrammatically depicts an illustrative flow profile trajectory 148 that is stored in memory and indexed by the flow control module 146 to dynamically define the appropriate flow for operating the HPS 100 depending on the presently detected fluid level in the tank between $L_L$ and $L_H$. The minimum flow rate $F_{min}$ and maximum flow rate $F_{max}$ are limited to the adjustability range of the flow control device 124 (FIG. 2).

In these illustrative embodiments the flow profile trajectory 148 has variable flow rate portions at the margins and a substantially constant flow rate portion intersecting the target level $L_{SS}$ in the tank 144. The flow control device 124 can be advantageously sized in relation to the expected fluid flow into the tank 144 so that the HPS 100 can be operated at a constant flow rate within a margin of flow level variation at the $F_{SS}$. That permits compensating for expected process variation without unnecessarily constantly adjusting the flow rate under stead state operating conditions. However, when the fluid level continues to drop even at reduced flow rates below the steady state operating condition, that indicates that fluid intake by the tank 140 is decreased or stopped.

Figure 7:
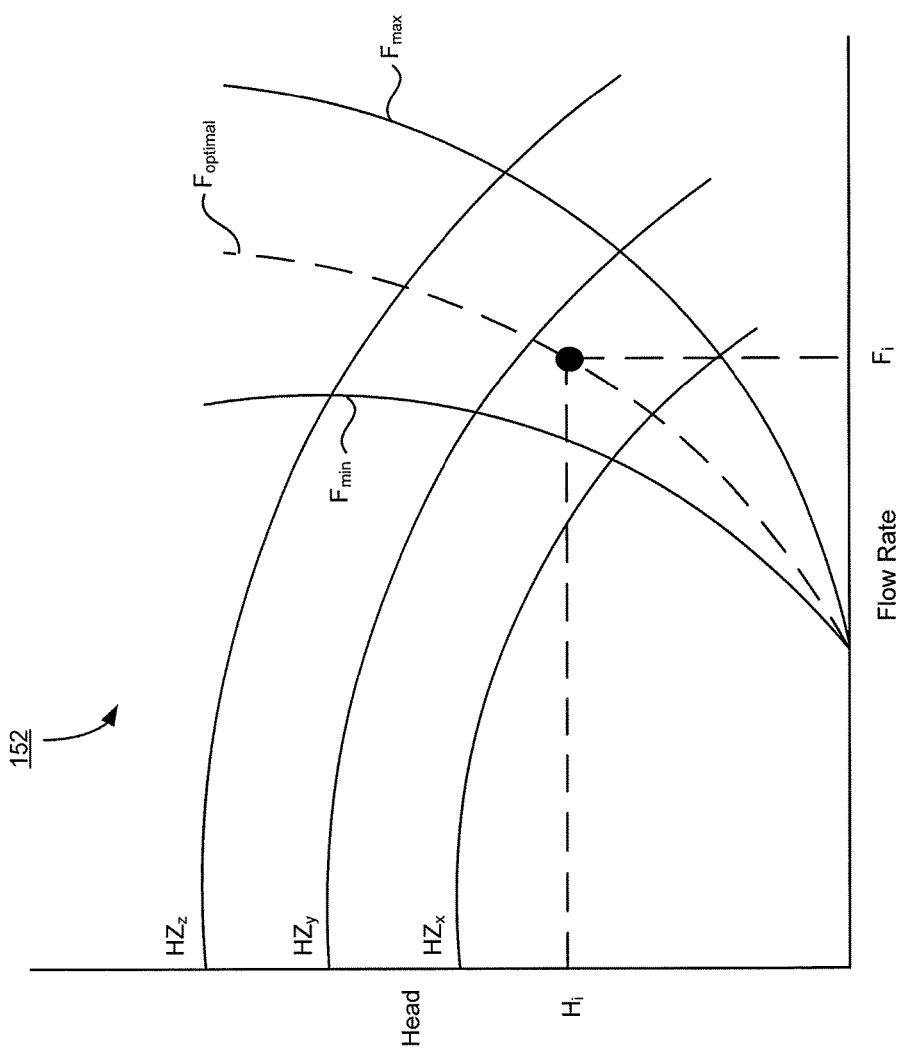
FIG. 7 is a graphical representation of a transformation function stored in memory and indexed to define the motor speed to optimize performance of the pump at a given flow rate.

The flow control 146 provides a process input to a motor controller 150 that adjusts motor 110 speed for the present flow rate to maintain an optimal operating performance of the pump 112. The motor controller 150 indexes a transformation function 152 stored in memory that maps the present flow rate to a selected motor speed. FIG. 7 graphically depicts the construct of an illustrative transformation function that is constructed in accordance with embodiments of this technology. An operating curve is depicted for the HPS 100 that defines the performance range for various flow rates, the operating space between the lower performance boundary $F_{min}$ and the upper performance boundary $F_{max}$. From these boundary curves and $F_{max}$, generally defined by the law of affinity, an optimal performance curve $F_{optimal}$ can be mathematically constructed at the midpoint therebetween. The motor controller 150 functions to set the speed of the motor 110 so that the HPS 100 operates along the $F_{optimal}$ curve at all flow rates.

The motor controller 150 calculates the present point on the $F_{optimal}$ curve defined by coordinates of instantaneous flow $F_i$ and head $H_i$. The instantaneous flow $F_i$ is input from the flow control 146, and the instantaneous head $H_i$ is measured in the pump 112, such as at the outlet 127 downstream of the flow control 124. Alternatively, for example, the head $H_i$ can be monitored in a connecting line connected in fluid communication with the outlet 126. The transformation function 152 then interpolates between adjacent motor frequency curves intersecting the $F_{optimal}$ curve to determine what speed to operate the motor 110. Correlating the motor 110 to flow and head advantageously balances the fluid up thrust and down thrust forces acting on the impeller 140 at all the various flow rates, optimizing pump performance and minimizing wear and tear on the pump's internal moving parts.

In some embodiments at the margins the motor control 150 de-energizes the motor 110 when the flow controller calls for $F_{min}$, and only re-energizes the motor 110 again when the motor controller 204 calls for $F_{max}$. When the motor 110 is energized, the flow control 146 and motor control 150 cooperatively modulate the HPS 100 fluid flow to maintain $L_{SS}$ in the tank 144, and in turn modulate the speed of the motor 110, such as by varying the power frequency, to at all times maintain the HPS 100 operating on the $F_{optimal}$ operating curve.

The various features and alternative details of construction of the apparatuses described herein for the practice of the present embodiments will readily occur to the skilled artisan in view of the foregoing discussion, and it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present embodiments.

It is to be understood that even though numerous characteristics and advantages of various embodiments of the described technology have been set forth in the foregoing description, together with the details of the structure and function of various embodiments of the invention, this disclosure is illustrative only, and changes may be made in detail, especially in matters of structure and arrangement of parts within the principles of the described technology to the full extent indicated by the broad general meaning of the terms in which the appended claims are expressed. For example, other machine components and various arrangements thereof than the pick-and-place cell described are contemplated while still maintaining substantially the same functionality without departing from the scope and spirit of the claimed invention. Further, although the illustrative embodiments described herein are directed to automated manufacturing cells, and related technology, it will be appreciated by those skilled in the art that the claimed invention can be applied to other devices employing a processor-based controller as well without departing from the spirit and scope of the described technology.

What is claimed is:

1. A pump system configured to maintain a desired level of fluid in a tank by pumping fluid from the tank to compensate for fluid being added to the tank, the pump system comprising:
    a multiple stage pump having an inlet that is fluidly connected to an outlet of the tank;
    a motor operably rotating the stages to pressurize the fluid in the pump, moving the pressurized fluid toward an outlet of the pump;
    a motor controller operably indexing a transformation function that is stored in computer memory relating an instantaneous fluid flow rate to a corresponding preferred motor speed that optimizes the pump's performance, selectively varying the speed of the motor;
    a flow control device fluidly connected to the pump outlet, so that substantially all of the pressurized fluid flows through the flow control device, and operably indexing a flow profile stored in computer memory relating the instantaneous fluid flow rate to a deviation from the desired level of fluid in the storage tank, selectively varying the instantaneous fluid flow rate of the pressurized fluid flowing from the pump outlet; and
    a controller executing flow control logic adjusting the motor controller independently of adjusting the flow control device in response to a call from the flow profile for changing the instantaneous fluid flow rate that fluid is pumped out of the tank.

2. The pumping assembly of claim 1 wherein an instantaneous fluid level in the tank corresponds to a pressure of the fluid entering the pump.

3. The pumping assembly of claim 1 wherein the instantaneous fluid flow rate varies nonlinearly in relation to the instantaneous level of the fluid in the tank supplying the fluid to the pump.

4. The pumping assembly of claim 1 wherein the controller adjusts the instantaneous fluid flow rate from a first flow rate to a different second flow rate and adjusts the motor speed from a first speed at the first flow rate to a different second speed at the second flow rate.

5. The pumping assembly of claim 1 wherein the motor controller operably varies the electrical frequency of power supplied to the motor.

6. The apparatus of claim 1 wherein the flow profile deenergizes the motor when the fluid level reaches a predetermined lower limit, and after having deenergized the motor, energizes the motor when the fluid level reaches a predetermined upper limit.

\* \* \* \* \*